United States Patent
Sinha

(10) Patent No.: US 7,653,032 B2
(45) Date of Patent: Jan. 26, 2010

(54) APPLYING WIRELESS NETWORK CONNECTION PROFILES USING WINDOWS MANAGEMENT INSTRUMENTATION

(75) Inventor: Suman K. Sinha, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 876 days.

(21) Appl. No.: 10/742,111

(22) Filed: Dec. 18, 2003

(65) Prior Publication Data

US 2005/0135315 A1    Jun. 23, 2005

(51) Int. Cl.
*H04Q 7/24* (2006.01)
(52) U.S. Cl. .................. 370/338; 370/339; 455/557
(58) Field of Classification Search .......... 370/338, 370/342, 343, 339; 455/457, 557, 550, 414, 455/426; 709/220, 223, 224, 203; 719/318; 713/200–202
See application file for complete search history.

(56) References Cited

U.S. PATENT DOCUMENTS

| | | | | |
|---|---|---|---|---|
| 6,085,235 A * | 7/2000 | Clarke et al. | .............. | 709/219 |
| 6,711,630 B2 * | 3/2004 | Dubal et al. | .............. | 710/8 |
| 6,957,086 B2 * | 10/2005 | Bahl et al. | .............. | 455/557 |
| 6,983,317 B1 * | 1/2006 | Bishop et al. | .............. | 709/223 |
| 2002/0072391 A1 * | 6/2002 | Itoh et al. | .............. | 455/557 |
| 2004/0003060 A1 * | 1/2004 | Asoh et al. | .............. | 709/220 |
| 2004/0243840 A1 * | 12/2004 | Tran | .............. | 713/201 |
| 2005/0055700 A1 * | 3/2005 | Singler et al. | .............. | 719/311 |
| 2006/0116148 A1 * | 6/2006 | Bahl et al. | .............. | 455/517 |
| 2006/0248539 A1 * | 11/2006 | Sanghvi et al. | .............. | 719/318 |

* cited by examiner

*Primary Examiner*—Ayaz R Sheikh
*Assistant Examiner*—Chuong T Ho
(74) *Attorney, Agent, or Firm*—Marger Johnson & McCollom, P.C.

(57) ABSTRACT

A device includes a wireless communication port to allow the device to communicate with a wireless network. The device also has at least two wireless network profiles and a distributed device management interface to manage the wireless network profiles. The device management interface is established by defining at least one wireless network adapter class and providing properties for the wireless network adapter class. A setting class is defined for wireless network adapter configurations and the wireless network adapter is associated with a wireless provider.

7 Claims, 3 Drawing Sheets

APPLYING WIRELESS NETWORK CONNECTION PROFILES USING WINDOWS MANAGEMENT INSTRUMENTATION

BACKGROUND

A wireless network profile allows a user to connect to a wireless network. The network profile typically includes the network name to which the user is attempting to gain access or the service set identifier (SSID) that identifies the network, an operation mode, encryption algorithms used, etc. Users may have several profiles on their wireless appliance, such as a personal digital assistant (PDA), laptop or palm computer, etc. The user may set up the profiles in a preferred order list, and the appliance will work down the list until a profile is employed that allows connection.

In some instances, the profile used to connect may not have the desired settings from the network's point of view. For example, a profile may not have any encryption attached to it for a particular SSID and was intended only for use on wireless access points within a particular physical structure. This profile may still allow the user to connect, but may also leave the network open to hostile acts. The system administrator may not have any other option but to remove that user from the network, even though the user connected to the network validly. Alternatively, the system administrator may not be able to remove the user, even though the user is leaving the network open for attack.

In other scenarios, a user may not be able to connect to a network because the user cannot locate or does not have a proper network profile for a particular wireless location. The user's attempts to access the network are denied, or they are provided access with minimal privileges and cannot get to the resources on the network the user needs.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1:
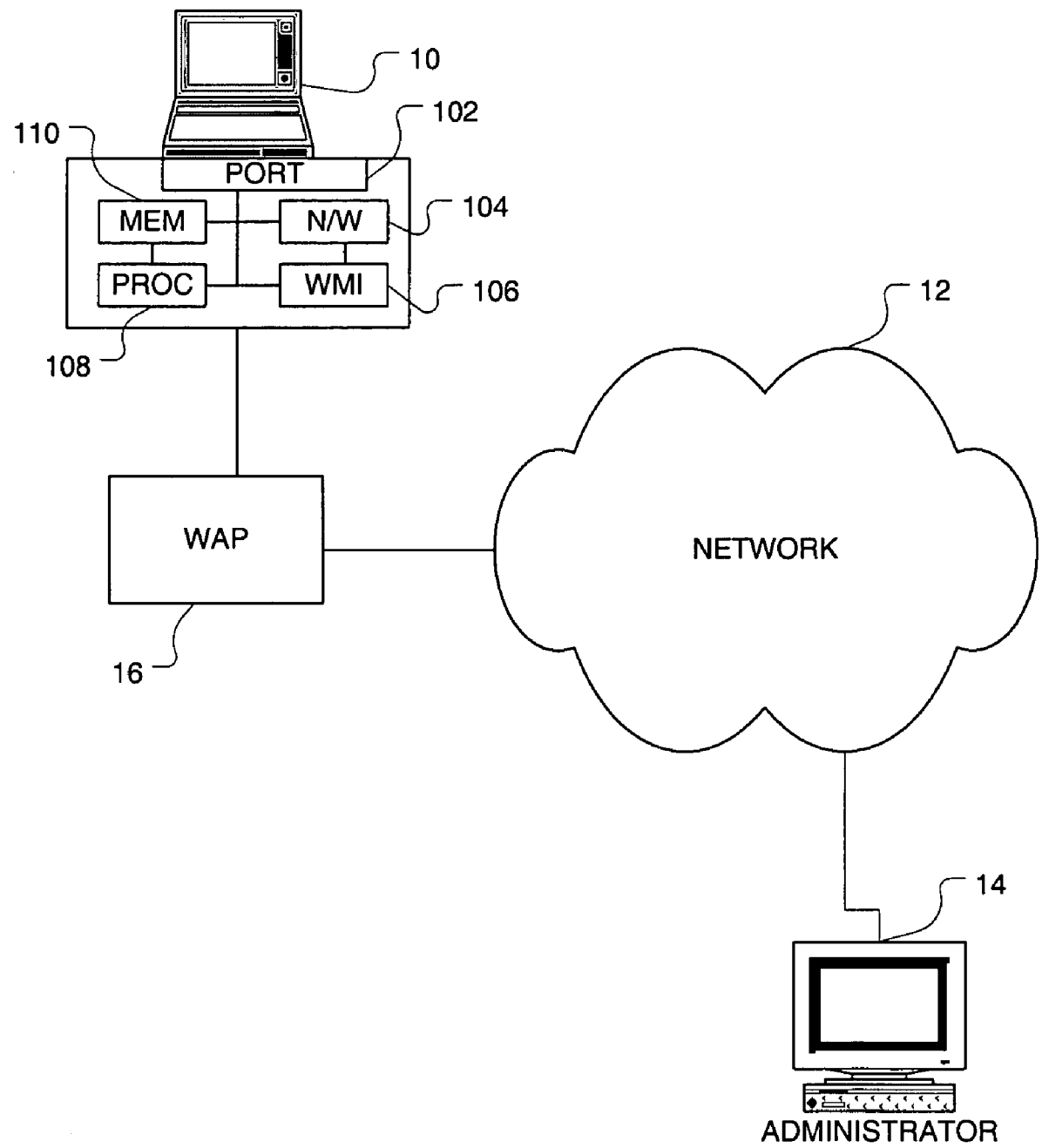
FIG. 1 shows an embodiment of a wireless network.

FIG. 1 shows an example of a wireless device attached to a wireless network. For example, a wireless device 10 makes connection to the network 12. The wireless device typically accesses the network through a wireless access point 16. Access to the network is normally done by the user selecting a predefined set of properties for the connection, referred to here as a wireless network profile.

A typical user may have several different wireless network profiles. For example, the user may have a profile for an infrastructure mode when the user is accessing the network through a wireless access point inside an enterprise's domain, or one for an ad-hoc mode for when the user is accessing from a so-called "WiFi hotspot." Similarly, the user may have profiles for differing levels of security, differing levels or methods of encryption, etc.

Problems can arise when a user accesses a network using the 'wrong' profile, such as one with the proper username and password specified for the network, but the incorrect level of security. For example, a user may have two profiles for accessing an enterprise network, one with a high level of security and one without any security. The user may accidentally use the second one when he or she should be using the first.

The system administrator cannot correct the situation, except to disconnect the user by denying access to the network. If the user is a legitimate network user, the user will get frustrated with the repeated disconnections. The user may not realize that the problem lies in the profiles. If the user has a management module on the device, however, the system administrator could assist the user.

In some embodiments, the device 10 may have a communications port 102. Generally, as the device is employed wirelessly, the port 102 would be a wireless port in accordance with whatever wireless technology is being used. Examples include wireless ports in accordance with the Institute of Electrical and Electronic Engineers (IEEE) standards 802.11a, 802.11b or 802.11g, "Local and Metropolitan Networks," infrared, radio frequency technologies such as Bluetooth™.

The device may also have a memory 110, in which the many profiles may be stored, and a processor 108 to operate the device. At least one network adapter 104 may also reside on the device. A network adapter may be software or a hardware component that allows the device to connect using a particular technology or protocol. More than likely, the device will also include a processor of some kind that provides both the device functionality and accesses the memory to get the profiles, interface with the user, etc.

In one embodiment of the invention, the device has a management module that allow the operating system of the device, as well as the system administrator, to access information about the various components of the devices. One such example of such a management module is a Web-Based Enterprise Management (WBEM) module.

WBEM Web-Based Enterprise Management (WBEM) is a set of management and Internet standard technologies developed to unify the management of enterprise computing environments. WBEM provides the ability for the industry to deliver a well-integrated set of standard-based management tools leveraging the emerging Web technologies. The Distributed Management Task Force (DMTF) has developed a core set of standards that make up WBEM. The standards include includes a data model, the Common Information Model (CIM) standard, an encoding specification, xmlCIM Encoding Specification, and a transport mechanism, CIM Operations over HTTP. There is also an object management function call Component Object Model (COM).

One particular embodiment of WBEM is provided by Microsoft®, called Windows® Management Instrumentation (WMI). WMI is implemented in most Windows® operating systems. WMI defines providers for each managed object in a system. Providers are similar to drivers; a provider supplies WMI with data from a managed object. WMI also allows systems administrators to manage devices across the network. Currently, no ability within WMI or other WBEM approaches to allow management of wireless network profiles remotely.

In the embodiment of device 10 shown in FIG. 1, the device is WBEM enabled, having a WMI module 106. System administrator 14 may also be connected to the network 12, and can use the WMI module on the device to manage wireless network profiles on the wireless device. It must be noted that other types of WBEM modules, such as WMI providers, may already exist on the device 10, but they are for local use only. That is, they only work within the device's operating system and are not useful remotely. In the embodiment of FIG. 1, the WMI provider shown is for wireless network profiles.

The below examples focus on WMI-specific instances because WMI is one of the most prevalent WBEM implementations. The application of the invention is not limited to WMI. Structures and components of other WBEM implementations that are analogous to those discussed herein may be used to implement the embodiments of the invention and these implementations fall within the scope of the claims.

In order for there to be a wireless provider within WMI, an extension may be made to the Common Information Model (CIM). The CIM abstracts and defines the managed environment using an object-oriented paradigm. The CIM object schema addresses systems, devices, application deployment and the physical environment. The CIM objects include computers, systems, devices such as printers and batteries, controllers such as peripheral component interface (PCI) and universal serial bus (USB) controllers, files, software, physical elements such as the chassis and connectors, people, organizations, networks, protocol endpoints, etc.

In addition CIM provides a mechanism for associations and methods. Associations describe relationships between dependencies in the objects, component relationships of objects to other objects, and more. Methods may include input/output parameters lists and return codes. The information about associations and methods are stored in the WMI repository.

The data in the WMI repository is organized by schemas, which are loaded into 'namespaces.' A namespace provides a domain or 'container' for a schema and for the instances of classes in that schema. Namespaces may be used to define collections of management information such as objects and associations to limit requirements, define specific view of the management data, such as aggregating all the environmental data about temperatures and voltages in a namespace, and allow the use of different models and schemas.

Figure 2:
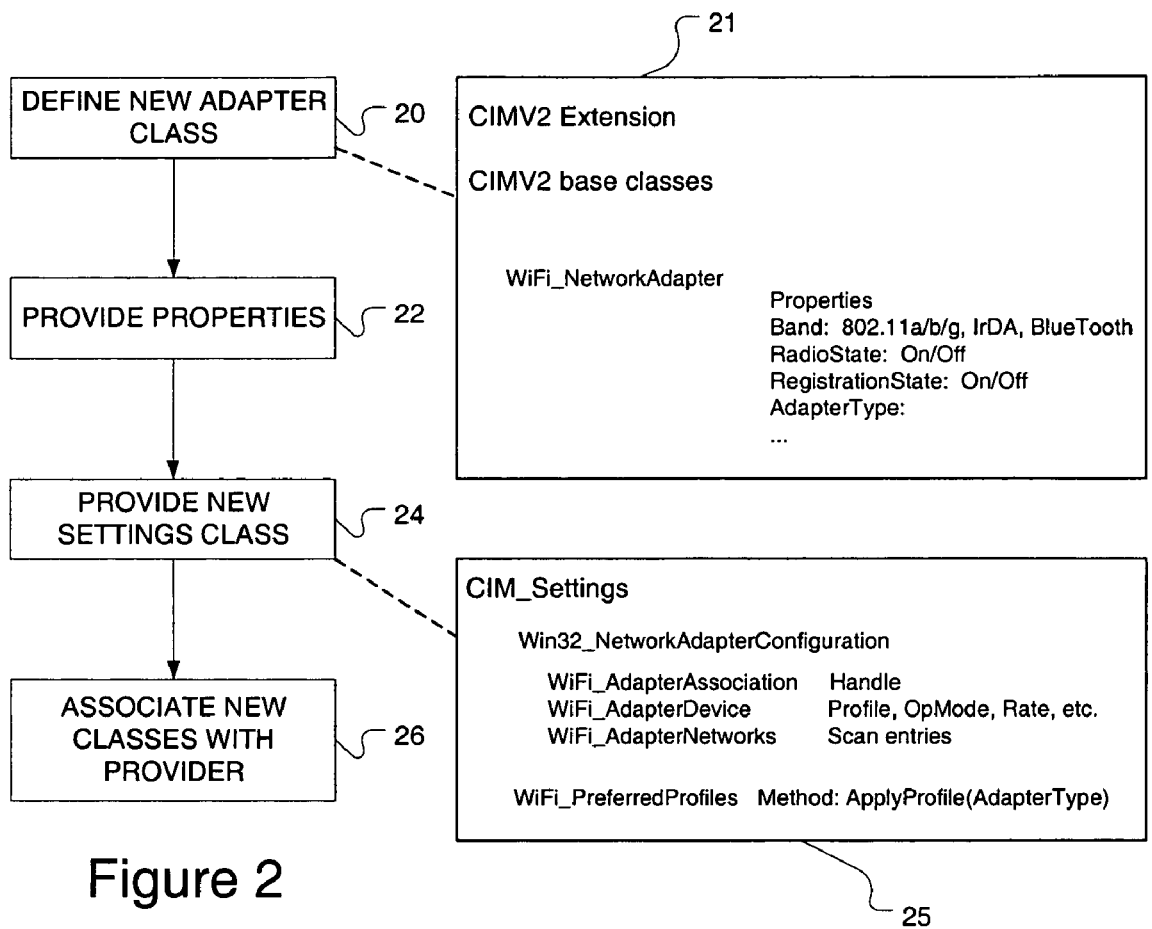
FIG. 2 shows a flowchart of an embodiment of a method to establish a wireless provider.

One such namespace is used to manage network adapters. For the purposes of discussion here, this namespace will be labeled CIMV2 namespace. To create a wireless provider, the CIMV2 namespace could be extended. Currently, CIMV2 has two classes for managing network adapters, CIM_NetworkAdapter and Win32_NetworkAdapter. A new class could be added, WiFi_NetworkAdapter. WiFi refers to wireless fidelity, but the network adapter defined could be used with any wireless network adapter. An embodiment of a method to establish a wireless provider is shown in FIG. 2. The new adapter class would be defined at 20.

As part of defining a new adapter class is the providing of properties for that class and their respective values at 22. An example of defining a new class is shown in pseudo code form in boxes 21. The properties may include the wireless 'band' such as 802.11a/b/g, IrDA, BlueTooth, etc., the radio state, the registration state, etc.

Correspondingly, a new settings class may be defined. CIMV2 namespace has a class CIM_Setting that is derived from the Win32_NetworkAdapterConfiguration class. The new class could be named WiFi_NetworkAdapterConfiguration could also be derived from the CIM_Setting class. The WiFi_NetworkAdapterConfiguration class would manage the list of preferred profiles, wireless networks and wireless network configurations, etc. This is shown at 24 in FIG. 2, with an example of accompanying pseudo code at 25.

These classes and properties then make up the wireless provider at 26. The wireless provider would manage all the functional behavior of the wireless network. The user can query the provider for a list of preferred profiles and then query for a list of supported wireless adapters. After obtaining the two lists, the user can apply a preferred network connection profile to connect to a wireless network.

Figure 3:
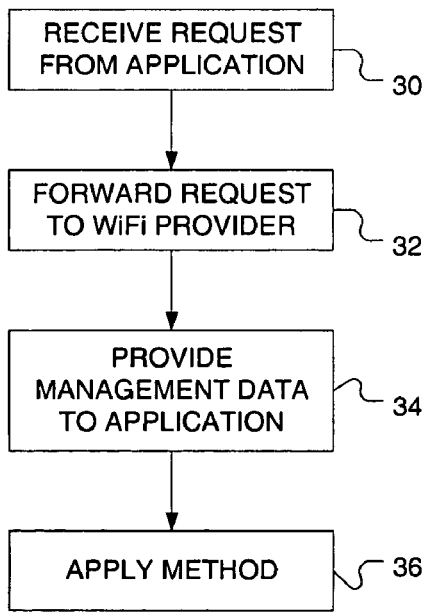
FIG. 3 shows a flowchart of an embodiment of a method providing connection to a wireless network.
Figure 4:
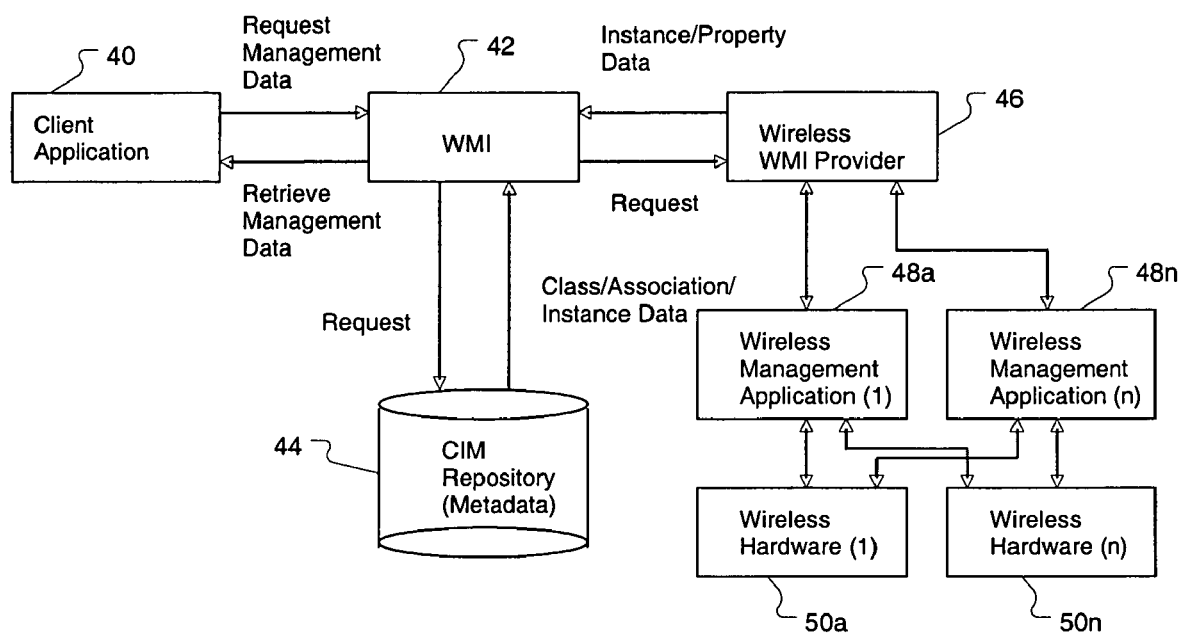
FIG. 4 shows an embodiment of a message flow diagram of a wireless user and a system administrator during connection to a wireless network.

The application of the profiles managed by the wireless provider is shown in FIGS. 3 and 4. Generally, the provider receives a request from a client application at 30 in FIG. 3. This is shown as a request from client application 40 sending a request for management data to WMI 42. This request is then forwarded at 32 in FIG. 3, shown as a request from the WMI 42 to the Wireless Provider 46. The wireless provider then routes the request to the appropriate wireless management application 48a-n, which in turn retrieves any necessary information from the wireless hardware 50a-50n.

The request is also forwarded to the CIM repository 44. The CIM repository returns any instances of classes and associations that match the request. The wireless provider returns the instances of any property data needed from the wireless hardware. The WMI 42 then provides the management data gathered to the application at 34 of FIG. 3. If there were a particular method to be applied by the client application to make connection, the method would be executed at 36.

For example, there could be another settings class, WiFi_PreferredProfile. This preferred profile class could apply an algorithm that selects the appropriate network profile based upon available network adapters types. For instance, a user may have two different types of network adapters, one for 802.11a and one for BlueTooth®. The BlueTooth® adapter may not be functioning correctly, so the method would base its decision on the type of adapter available, 802.11a, so the preferred profile selected would be an 802.11a profile.

Returning to the previous example, where the user is connected to the network with the wrong profile, the use of WMI opens up other options. For example, the system administrator could access the device remotely and change the profile being used to connect to the network. The user is connected with a profile not having the proper security. The systems administrator could use the WMI module to access the management data, find the correct profile and then switch to that profile.

Similarly, if the user is within an enterprise's network, such as within the buildings of the user's employer, the network administrator could use WMI to access the user's device and log the user into the network, overcoming any difficulties the user was having in designating the correct profile, etc.

In this manner, management of wireless devices remotely can be accomplished by implementations of the invention. The embodiments of the invention may be implemented as machine-readable code that, when executed, causes the machine to perform the methods discussed above. The machine-readable code may be contained on an article of machine-readable media, the machine being the wireless device.

Thus, although there has been described to this point a particular embodiment for a method and apparatus for creation of virtual devices in a UPnP network, it is not intended that such specific references be considered as limitations upon the scope of this invention except in-so-far as set forth in the following claims.

What is claimed is:

1. A wireless device, comprising:

a wireless communication port to allow the device to communicate with a wireless network through a wireless access point;

a memory including at least two wireless network profiles, the wireless network profiles comprising a predefined set of properties for a connection with the wireless network, the predefined set of properties including security properties and encryption properties;

a device management module to allow an operating system of the wireless device and a system administrator of the network to access information about components of the wireless device, and to present a user with a list of preferred profiles on the wireless device for the connection to the wireless network and a list of supported wireless network adapters for the preferred profiles, wherein the device management module allows the system administrator to access information about components of the wireless device remotely through the network and wherein the device management module includes an extension for a namespace associated with network adapters; and a user interface to allow the user to select one of the preferred profiles to establish the connection to the wireless network, wherein the device management module further allows the system administrator to access the wireless device remotely through the network and select a different wireless network profile than the preferred profile selected by the user to establish the connection to the wireless network.

2. The device of claim 1, wherein the wireless communication port is in accordance with a wireless technology being used and is selected from a group comprised of: an 802.11b port, an infrared port, and a radio frequency port.

3. The device of claim 1, the wireless network adapters further comprising a hardware adapter.

4. The device of claim 1, the wireless network adapters further comprising a software adapter.

5. The device of claim 1, the device management module further comprising a Web-Based Enterprise Management module.

6. The device of claim 1, the device management module further comprising a wireless provider in accordance with Windows Management Instrumentation.

7. The device of claim 1, the wireless network profiles including at least one of an infrastructure mode profile and an ad-hoc mode profile.

* * * * *